United States Patent Office 3,460,377
Patented Aug. 12, 1969

3,460,377
APPARATUS FOR CONTROLLING THE EXCITATION OF A UTILIZATION DEVICE
Sarkis V. Kalustian, Los Angeles County, Calif., assignor, by mesne assignments, to the United States of America as represented by the United States Atomic Energy Commission
Filed Jan. 14, 1966, Ser. No. 520,746
Int. Cl. G01n 29/00
U.S. Cl. 73—71.6                                    9 Claims

ABSTRACT OF THE DISCLOSURE

Actuating electrical power for a shaker table is provided in a plurality of channels, each of which includes electrical power in a prescribed band pass, such that the collective effect of all the channels is to provide a broad frequency spectrum of power. A transducer carried by the shaker table provides a signal output representative of the table motion which is processed through an output system providing a plurality of signals representative of the magnitude for each channel input to the shaker table. The signals corresponding to each channel from the output system are integrated during a first time period, and then used during a second time period to level shift the outputs of the output channels and the inputs from the input channels to the shaker table by a magnitude which is a function of the integrated output signal.

---

This invention relates to the control art, and more particularly to a method and apparatus for controlling a variable in a manner to render ineffective the influence of the control upon itself and thereby to prevent regeneration, hunting or overshoot.

Although the present invention may have other applications and should not be limited to those described herein, the invention has been found to be especially useful in accurately maintaining the excitation components of a shaker table in predetermined constant proportions.

It is conventional to test specimens on a shaker table mounted in much the same manner as a dynamic loudspeaker. The excitation of the table is derived from a conventional noise generator. However, the output of the noise generator is passed through a plurality of input bandpass filters and a plurality of corresponding input attenuators before it is applied to the shaker table. For example, eighty filters may be employed with contiguous pass bands of twenty-five cycles per second each for a spectrum coverage from zero to two thousand cycles per second. Thus, the output of the noise generator is divided between eighty parallel input channels. One input attenuator is provided at the output of each input filter.

The purpose of the input attenuators is to control the input to the shaker table. The input attenuators are continuously varied as will be explained. The outputs of the input attenuators are recombined in a summing amplifier and the output of the summing amplifier is employed as the shaker table excitation signal.

An accelerometer is mounted on the shaker table to sense its movement. The output of the accelerometer is again divided into, for example, eighty output channels by eighty output filters which may be identical to the input filters. An output attenuator is then provided at the output of each output filter. The output attenuators are manually adjusted to give a desired spectrum. When the shaker table is excited properly to give the desired spectrum, the outputs of the output attenuators should be equal. However, it is necessary to provide an equalization system to maintain this equality. For this purpose, the prior art equalization system includes three components for each output channel. The first is a linear detector. The second is a smoothing filter. The third is the input attenuator for the corresponding input channel. Thus, for example, the output of a 25 to 50 c.p.s. output channel is rectified, smoothed and the output of the 25 to 50 c.p.s. input channel is changed in accordance with the detected and smoothed output of the 25 to 50 c.p.s. output channel. The same is true for all of the other 79 channels.

In the past the above-described prior art system has suffered from several serious disadvantages. Mainly, the equalization corrections which are made by the system are so inaccurate that it has often been impossible to duplicate shaker table test results under precisely the same test conditions. Further, the causes of inaccuracies have been difficult to determine, as will be explained. In the conception of the present invention, the following theory was developed for the causes of error. The invention was then conceived, constructed and tested successfully, based upon this theory.

One cause of inaccuracy in the prior art system was that the smoothing filter did not develop a true average of the rectified output of an output channel. Another cause was due to the fact that a continuous correction was made. That is, equalization was made continuously and over a period of time during which approximate averaging was being performed by the smoothing filter. The equalization correction made therefore became a function not only of the error requiring correction, but also of the correction itself made shortly before. In other words, the correction should have been made due to error alone. However, it was not. The correction made was also a function of the correction made previously.

Still other factors made a solution to these problems difficult. The prior art system, utilizing a continuously operated automatic gain control feedback loop, required an error signal of some finite magnitude larger than zero to maintain any corrective equalization. The average value of the error signal could be small, but it could have large fluctuations. It was, however, difficult to ascertain the existence of these fluctuations due to the fact that the system indicators often showed the system to be functioning adequately when it was not. This failure was due to the fact that the indicators employed time constants several times longer than the fluctuations of the error signal.

Another way to express the error signal fluctuations is that without true averaging over an infinite time, a variation about the mean must invariably occur and will occur dependent upon the time constants of the feedback loop.

In the conception of the present invention, statistical methods of analyses of random processes were invoked. In accordance with the present invention, the above-described and other disadvantages of the prior art are overcome by estimating equalization required during an interval of time when the average of an output channel rectified signal is taken. During this averaging time interval, no change in equalization is made. A change is then made in equalization only after the estimate has been completely made. Equalization thus becomes a predictive process. Feedback is then eliminated except to the extent that a more or less step function change in equalization is made. Further, the predictive process will have a statistical accuracy determined by the degrees of freedom in a control channel. The system of the present invention thus does not change the statistical accuracy of an otherwise conventional system because this accuracy is affected only by filter bandwidth and averaging time. In particular, the degrees of freedom is equal to twice the product of the bandwidth and averaging time. The uncertainty of the equalization correction is then the reciprocal of the square root of the product of bandwidth and averaging time.

In accordance with the invention, the estimate of equalization required and its change are made by integrating the detected output of an output channel for the averaging interval. The output of the corresponding input channel is then changed inversely with the magnitude of the integrated signal. However, the change is made only after the averaging interval has terminated. Due to the fact that integration is employed, a true average is obtained which is more accurate than those obtained by the use of the smoothing filters of the prior art. Further, the equalization correction made in accordance with the present invention is not a function of itself and feedback is, in at least one respect, eliminated. That is, during the first and subsequent integration or averaging intervals, no correction is made. A correction is made only between such intervals.

It is also a feature of the present invention that the output of the said output channel is level shifted in accordance with the magnitude of the integrated signal. However, subsequent integration of the level shifted signal is not performed until the level shift is in fact fully completed. This further eliminates the effect of feedback upon the equalization correction. For example, if the output of an input channel is increased ten percent, the output of a corresponding output channel is decreased ten percent. Thus, after the first correction is made, if the correction is accurate the control system will see no error and further will not make any change in the correction previously made. Even though the system sees no error it will, however, maintain the correction previously made. Accordingly, a finite error input is not continuously required as in the prior art and its attendant large fluctuations may be avoided.

In accordance with still another feature of the invention, sampling is performed by a circuit which gradually changes from a prior sampled value to a current sampled value. The output of the sampling circuit is then fed to a follow-up system. The gradual change in the output of the sample circuit thus does not heavily load the follow-up system.

The above-described and other advantages of the present invention will be better understood from the following description when considered in connection with the accompanying drawings.

In the drawings which are to be regarded as merely illustrative:

Figure 1:
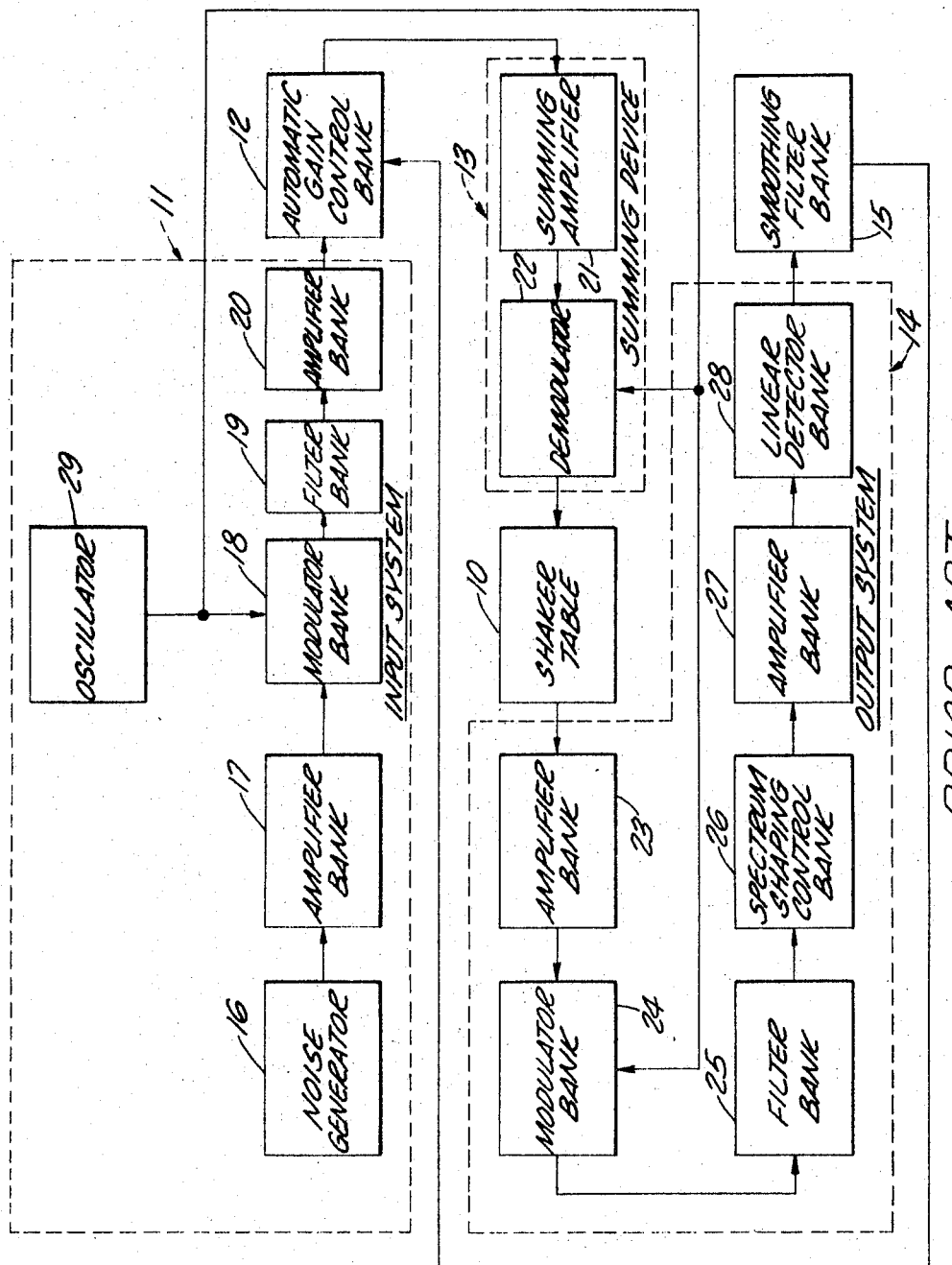
FIG. 1 is a block diagram of a prior art control system.

In FIG. 1, note will be taken that the utilization device is a shaker table 10. Shaker table 10 is excited by an input system 11 through an automatic gain control bank 12 and a summing device 13. Outputs are derived from shaker table 10 through an output system 14. These outputs are fed to a smoothing filter bank 15 which provides control signals for automatic gain control bank 12.

Input system 11 includes a noise generator 16. The output of noise generator 16 is divided into a plurality of channels. For example, as stated previously, 80 channels may be provided and each channel may have a bandwidth of 25 c.p.s. The pass bands of the channels may be located contiguous to one another to cover an audio frequency range of from zero to 2,000 c.p.s.

Only one noise generator 16 is provided. However, the banks to be described in input system 11 each will have 80 channels. These banks are amplifier bank 17, modulator bank 18, filter bank 19 and amplifier bank 20. Banks 17, 18, 19 and 20 are connected successively from noise generator 16 to automatic gain control bank 12. Automatic gain control bank 12 also has 80 corresponding channels. The gain of each one of these channels is then independently controlled in accordance with the output of each one of 80 corresponding smoothing filters in bank 15.

The outputs of each of the 80 gain controls in bank 12 are combined to provide a single signal. These outputs are combined in a summing amplifier 21 in summing device 13. Summing device 13 also has demodulator 22 that receives the output of summing amplifier 21 and energizes shaker table 10 in accordance therewith.

As stated previously, shaker table 10 has an armature which vibrates in accordance with the energization of a stator winding thereof. The motion of the armature is conventionally detected by an accelerometer. The output of the accelerometer is divided into 80 output channels. These 80 output channels are located in output system 14. They correspond to the 80 input channels in input system 11. The 80 output channels follow through each bank of output system 14. These banks are amplifier bank 23, modulator bank 24, filter bank 25, spectrum shaping control bank 26, amplifier bank 27 and linear detector bank 28. These banks are connected in succession from the shaker table accelerometer to smoothing filter bank 15.

An oscillator 29 in input system 11 provides an input to modulator bank 18, demodulator 22 and modulator bank 24. In the operation of the system shown in FIG. 1, spectrum control bank 26 is adjusted so that the amplitudes of the noise signals in the channels are in certain proportions. In other words, it may be desired that the amplitude of the noise in one of the channel pass bands be greater or less than that in another. For this reason, bank 26 may consist simply of 80 manually adjustable attenuating potentiometers.

If the excitation of table 10 is accurate, the average rectified output of each channel in linear detection bank 28 should be equal and approximately constant. Bank 28 thus will consist of a rectifier for each output channel. A separate smoothing filter is then provided for each rectifier in bank 15.

Automatic gain control bank 12 simply may be a follow-up system to control a potentiometer in each of the 80 input channels. In other words, each input channel would be provided with a separate follow-up system and potentiometer. Each follow-up system would be responsive to the output of a corresponding smoothing filter in bank 15.

Figure 2:
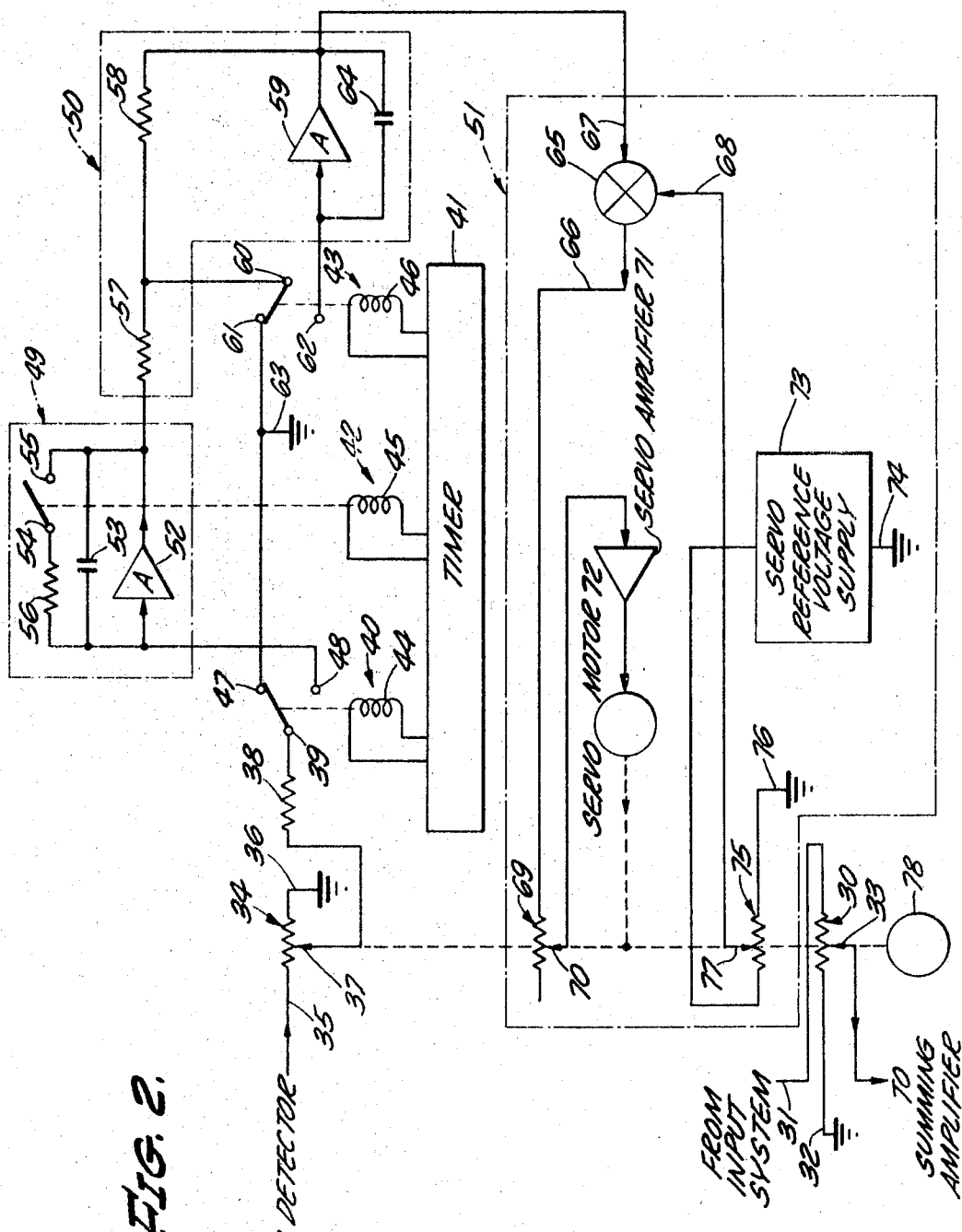
FIG. 2 is a schematic diagram of one embodiment of the present invention.

The system of the present invention contemplates the use of all of the prior art system shown in FIG. 1 with the exception of automatic gain control bank 12 and smoothing filter bank 15. In lieu of this equipment, equipment as shown in FIG. 2 is employed. However, it is to be noted that the equipment of FIG. 2 must be duplicated for each channel in the system. Only one such channel is shown in FIG. 2 because each of the other channels would be indentical to that shown in FIG. 2.

In FIG. 2, a potentiometer is shown at 30. One side of potentiometer 30 receives an input from a corresponding amplifier in bank 20 over a lead 31. The other side of potentiometer 30 is grounded at 32. Potentiometer 30 has a movable tap 33. Movable tap 33 is connected to the input of summing amplifier 21. It is the adjustment of potentiometer 30 which thus controls the noise level in a particular channel from input system 11 to summing amplifier 21. Lead 31 of potentiometer 30 is in fact connected from the output of a corresponding amplifier in bank 20. The manner in which the position of movable tap 33 on potentiometer 30 is controlled, is as follows.

The output from a rectifier in bank 28 is connected to one side of a potentiometer 34 over a lead 35. The other side of potentiometer 34 is connected to ground at 36. Potentiometer 34 has a wiper 37 that is electrically connected to one side of a resistor 38. The other side of resistor 38 is connected to a pole 39 of a relay 40. A timer 41 energizes and de-energizes relay 40 in a manner to be explained. Timer 41 also energizes and de-energizes relays 42 and 43. Relays 40, 42 and 43 thus have windings 44, 45 and 46, respectively, connected to timer 1. Relay 40 has contacts 7 and 48. Contact 47 is normally closed to pole 39. Contact 48 is normally open to pole 39.

Relay contact 48 is connected to the input of an integrator 49. The output of integrator 49 is connected to a track and hold circuit 50. The output of track and hold circuit 50 is fed to a follow-up system 51 which controls the positions of wipers 33 and 37 on potentiometers 30 and 34. Relays 42 and 43, respectively, control the operation of integrator 49 and track and hold circuit 50.

Relay contact 48 is connected to the input of an operational amplifier 52 in integrator 49. Integrator 49 also has a capacitor 53 connected from the input to amplifier 52 from relay contact 48 to the output of amplifier 52.

Relay 42 has a pole 54 and a normally open contact 55. Integrator 49 also has a resistor 56 connected from the input of amplifier 52 to relay pole 54. Relay contact 55 is connected to the output of amplifier 52.

Track and hold circuit 50 has a resistor 57 connected from the output of amplifier 52 to a resistor 58 which in turn is connected to the output of an operational amplifier 59.

Relay 43 has a pole 60 and contacts 61 and 62. Pole 60 is normally closed to contact 61 and normally opened to contact 62. Relay contacts 47 and 61 are connected to ground at 63. Relay contact 62 is connected to the input of amplifier 59. Track and hold circuit 50 also has a capacitor 64 which is connected from the input to amplifier 59 to the output thereof.

The output of amplifier 59 is connected to a difference circuit 65 in follow-up system 51. Difference circuit 65 develops a voltage on an output lead 66 which is proportional to the difference between an input voltage on a lead 67 from amplifier 59 and a feedback voltage on a lead 68.

A potentiometer 69 is connected from the output of difference circuit 65. Potentiometer 69 has a wiper 70 which is connected to the input of a servo amplifier 71. The output of servo amplifier 71 is then fed to a servo motor 72.

The follow-up system 51 has a servo reference voltage supply 73 which is connected to ground at 74. The output of supply 73 is connected to one side of a potentiometer 75. The other side of potentiometer 75 is connected to ground at 76. Potentiometer 75 has a wiper 77 which is connected to input lead 68 of difference circuit 65. Servo motor simultaneously moves the wipers 33, 37, 70 and 77 on potentiometers 30, 37, 69 and 75, respectively. Servo motor 72 moves the said wipers on the potentiometers all simultaneously. Servo motor 72 likewise mechanically operates an indicator 78.

The circuit elements of FIG. 2 are appropriately scaled to maintain the input to potentiometer 34 on lead 35 equal to a predetermined detected average larger than zero. The control is designed to maintain the average of the detected noise input to potentiometer 34 approximately constant and at some finite value.

Preferably, relays 40, 42 and 43 operate independently. That is, preferably, one of these three relays is energized at one time. Further, only one relay is energized at one time. One energized relay is therefore de-energized before any of the other two relays are energized. For example, relay 40 may be energized for three seconds. It will then be de-energized and relay 43 will next be energized for one second. Relay 43 will then be de-energized and relay 42 will be energized for two seconds. Thus, the cycle of the circuit of FIG. 2 may be six seconds and relay 40 may again be energized after relay 42 has been de-energized.

As stated previously, the equipment shown in FIG. 2 must be duplicated for each of the channels in the system with which it is associated. However, a single timer 41 might be provided for all channels. Thus, a relay in one or more or all of the other channels corresponding to relay 40 could be energized at the same time. The same is true for relays corresponding to relays 42 and 43. However, it is not necessary that all corresponding relays in all of the channels be energized simultaneously.

All of the circuit elements and blocks shown in FIG. 2 may be conventional. However, it will be noted that connection thereof as shown in FIG. 2 is quite different from the circuit elements and connections thereof employed in the prior art.

Potentiometers 34 and 75 may be logarithmically wound. For this reason, indicator 78 may be calibrated linearly in decibels.

It is also a feature of the invention that potentiometers 30 and 34 are calibrated logarithmically. This is true because when the control indicates what the input from system 11 to summing amplifier 21 should be, for example, reduced ten percent, the output on tap 37 of potentiometer 34 will be increased the same ten percent. The usefulness of this function will be explained in greater detail hereinafter. Potentiometer 69 is a linear potentiometer. It is employed to reduce the gain of amplifier 71 where the rate of change of potential on potentiometers 75 is large.

In the operation of the circuit of FIG. 2, the output of a rectifier in bank 28 is fed to potentiometer 34. After the system has been calibrated and the attenuators in bank 28 set, timer 41 will be turned on. Timer 41 will then energize relay 40 for three seconds. This will cause integrator 49 to integrate the input through resistor 38 for three seconds. Relay 40 will then be deenergized. Integrator 49 will then discontinue the integration. Relay 43 will then be energized. The output of amplifier 59 therefore will gradually change to the output of integrator 49. The time constant of track and hold circuit 50 is selected to be sufficiently short so that the output of amplifier 59 will be an accurate sample of the output of integrator 49 within the one second period during which relay 43 is energized. Relay 43 will then be de-energized. At this point, and until relay 43 is again energized, the output of amplifier 59 will remain constant.

After relay 43 has been de-energized, relay 42 will be energized for two reasons. During this period, integrator 49 will be reset to zero. Timer 41 will then repeat the cyclic energizations of relays 40, 43 and 42 so long as the equipment is in operation.

Follow-up system 51 at all times will maintain wipers 33 and 37 on potentiometers 30 and 34 at positions proportional to the input to difference circuit 65 from amplifier 59. However, note will be taken that if the potential of wiper 33 is moved toward ground, the potential of wiper 37 is moved away from ground and vice versa.

As stated previously, difference circuit 65 takes the difference of the voltages appearing on input leads 67 and 68. Servo amplifier 71 then drives motor 72 until the difference in the input voltages to difference circuit 65 becomes zero.

In accordance with the foregoing, it will be appreciated that equalization is performed by the adjustment of potentiometer 30. The affect of this adjustment is reflected in the change in amplitude of the noise appearing on input lead 35. This change is not necessarily linear and need not be for the circuit of FIG. 2 to operate effectively. Integrator 49, by integrating over a finite period preceding that during which a correction is made, predicts what the equalization correction should be. By using this predictive process, feedback is thus, to an extent, eliminated. Further, note will be taken that the integrated output of integrator 49 is not a function of the correction made by the automatic adjustment of potentiometer 30. The setting of wiper 33 on potentiometer 30 is not changed during the interval of integration. That is, the setting of wiper 33 is not moved during the energization of relay 40 and the attendant operation of integrator 49. On the contrary, the setting of wiper 33 takes place during the energization of relay 43 when the output of amplifier 59 gradually changes to that of the output of integrator 49. When relay 43 is de-energized, the setting of wiper 33 is not changed again until relay 43 is again energized. Thus, during a succeeding integration interval, after wiper 33 has been moved once and is again stationary, relay 40 is energized and integration begun again. Of course, between the energization of relays 43 and 40, relay 42 is energized to reset integrator 49.

As stated previously, the prior art control system of FIG. 1 suffered from several disadvantages. One of these was that an accurate average was not developed by capacitors used in the smoothing filters of bank 15. This disadvantage is overcome by the use of integrator 49 which develops an accurate average of the rectified noise appearing on lead 35. A further disadvantage of the prior art was that the automatic gain controls of bank 12 were continuously adjusted. This made the correction indicated at the output of bank 15 a function of the correction itself. Note will be taken that this is not true with the invention of FIG. 2 because during the operation of integrator 49, wiper 33 on potentiometer 30 remains stationary.

In addition to the foregoing, track and hold circuit 50 effectively samples the output of integrator 49. It also holds this output until an equalization has been fully completed. That is, poentiometer wiper 33 has been moved to a new position in which it is stationary. Thus, the sampling and storage features of the invention eliminates the troublesome aspect of the prior art system where a correction was made during the time that an approximate average of the rectified output of a channel was being detected.

It is also an outstanding feature of the present invention that the wipers 33 and 37 on potentiometers 30 and 34 are adjusted simultaneously. Further, when the attenuation of potentiometer 30 is increased, the attenuation provided by potentiometer 34 is decreased in the same proportion. On the other hand, when the attenuation provided by potentiometer 30 is decreased, the attenuation provided by potentiometer 34 is increased in the same proportion. This means that if the position of wiper 33 on potentiometer 30 is changed, during the next cycle of integration and sampling, the position of wiper 33 may not need to be changed and may not therefore be changed. For example, if the change made, for example in the channel having a pass band from 50 to 75 c.p.s. at the output of wiper 33 to summing amplifier 21 is linearly reflected at the rectifier in the 50 to 75 c.p.s. channel in bank 28, the inverse attenuation functions of potentiometers 30 and 34 will cause integrator 49 to produce a maximum output signal during a second integration interval which is equal to its maximum output at the end of an immediately preceding integration interval. This means that the output of circuit 50 will not change. Thus, the setting of wiper 33 will not change.

The inverse attenuation function of potentiometers 30 and 34 thus further isolate or prevent the feedback of a correction from affecting further corrections.

It is also an advantage of the present invention that potentiometer 34 in effect cancels out a correction previously made so that the continuous production of a finite error signal is not required to operate the system of FIG. 2. This means that the production of a finite error signal and its attendant large fluctuations in accordance with the prior art is avoided in accordance with the present invention.

Although only one specific embodiment of the present invention has been described and illustrated herein, many changes and modifications will of course suggest themselves to those skilled in the art. This single embodiment has been selected for this disclosure for the purpose of illustration only. The present invention should therefore not be limited to the embodiment so selected, the true scope of the invention being defined only in the appended claims.

What is claimed is:

1. The method of controlling the excitation level of a shaker table, said method comprising the steps of: energizing the shaker table; producing an output signal in accordance with the movement of said shaker table; detecting said output signal; integrating said detected signal for a predetermined period of time; and changing the energization of said shaker table inversely with the magnitude of said integrated signal at the end of said period.

2. The method of controlling the excitation level of a shaker table, said method comprising the steps of: energizing the shaker table; producing an output signal proportional to the movement of said shaker table; detecting said output signal; producing a first integrated signal by integrating said detected signal for a first predetermined period of time; maintaining the energization of said shaker table inversely proportional to the magnitude of said first integrated signal at the end of said first period; maintaining the level of said detected signal proportional to the magnitude of said first integrated signal at the end of said first period; producing a second integrated signal by integrating said changed detected signal for a second predetermined period of time subsequent to said maintaining steps; and maintaining the energization of said shaker table inversely proportional to the magnitude of said second integrated signal at the end of said second predetermined period.

3. In apparatus for controlling the excitation of a shaker table including an input system for providing noise input signals in each of a plurality of adjacent frequency bands through each of a corresponding number of input channels, an output system for providing noise output signals in the same said bands through a corresponding number of output chanels responsive to the motion of the table, a summing device connected to said input system for combining a plurality of said input signals, said device being connected to means for powering said shaker table, and a gain control circuit interrelating the input system and the summing device, the improvement comprising: first means connected to receive the output of an output channel and integrate the same; and second means selectively connectable with said first means and actuable at the end of a predetermined integration period to adjust the input to said summing device from an input channel corresponding to said output channel inversely with the magnitude of the output of said first means.

4. In apparatus for controlling the excitation of a shaker table, said apparatus including an input system for providing noise input signals in each of a plurality of adjacent frequency bands through each of a corresponding number of input channels, an output system for providing noise output signals in the same said bands through a corresponding number of output channels generated in response to the motion of the table, a summing device connected to receive a plurality of input signals for combining the same to power the shaker table, a gain control circuit comprising. first means connected to an output channel of said output system and actuable to integrate the output of said output channnel; second means selectively connectable to said first means and said summing device and actuable at the end of a predetermined integration period to adjust the input to said summing device from an input channel corresponding to said output channel inversely with the magnitude of the output of said first means; and third means responsive to the output of said first means and actuable at the end of said period to adjust the input to said first means from said output channel in accordance with the magnitude of the output of said first means.

5. In apparatus for controlling the excitation of a shaker table, said apparatus including an input system for providing noise input signals for each of a plurality of adjacent frequency bands through each of a corresponding number of input channels, an output system for providing noise output signals in the same said bands through a corresponding number of output channels in response to the motion of the table, a summing device connected to the input channels for combining a plurality of input signals and powering the shaker table therewith, and a gain control circuit interconnecting the input channels and the summing device comprising: an integrator fed by said output system and actuable to integrate the output of an output channel; means to actuate said integrator for a predetermined integration period; a sampling circuit connected with the integrator and actuable to change its output gradually to that of said integrator during a sampling period and to hold the sampled output of said integrator until the termination of the next succeeding integration period; means to actuate said sampling circuit for a sampling period subsequent to said integration period; means to reset said integrator during a reset period subsequent to said sampling period and prior to the next succeeding integration period; means interconnecting the input system and summing device to adjust the input to said summing device from an input channel corresponding to said output channel inversely with the magnitude of the output of said sampling circuit; and means to adjust the input to said integrator in accordance with the magnitude of the output of said sampling circuit.

6. In apparatus for controlling the excitation of a shaker table including an input system for providing noise input signals in each of a plurality of adjacent frequency bands through each of a corresponding number of input channels, an output system for providing noise output signals in the same said bands through a corresponding number of output channels in response to the motion of the table, and a summing device connected to the input system for combining a plurality of input signals and powering the shaker table therewith, a gain control circuit comprising: an integrator; first means actuable to couple the output of one of said input channels to the input of said integrator for a predetermined length of time; a track and hold circuit; second means actuable after deactuation of said first means for coupling the output of said integrator to the input of said track and hold circuit; third means actuable after deactuation of said second means for resetting said integrator to a predetermined condition; a selectively controllable device coupled between the output of one of said output channels corresponding to said one input channel and said summing device; and a follow up system connected to said track and hold circuit output for actuating said control device to change the output thereof to said summing device inversely with the magnitude of the output signal of said track and hold circuit.

7. In apparatus for controlling the excitation of a shaker table, said apparatus including an input system for providing noise input signals in each of a plurality of adjacent frequency bands through each of a corresponding number of input channels, an output system for providing noise output signals in the same said bands through a corresponding number of output channels in response to the motion of the table, a summing device connected to receive a plurality of input signals and powering the shaker table therewith, a gain control circuit comprising: a first potentiometer having a wiper and a winding, said winding of said first potentiometer being connected across the output of one of said input channels; a first amplifier; a first capacitor connected from the output of said first amplifier to the input thereof; first switch means connected to the output of said first amplifier; a first resistor connected from the input of said first amplifier to said first switch means; second switch means connected to the input of said first amplifier; a second resistor connected from the wiper of said first potentiometer to said second switch means; third switch means; a third resistor connected from the output of said first amplifier to said third switch means; a servomechanism having an output shaft movable in accordance with the magnitude of an input signal thereto; a second amplifier connected from said third switch means to said servomechanism; a fourth resistor connected from said said third switch means to the output of said second amplifier; a second capacitor connected from the output of said second amplifier to the input thereof; a second potentiometer having a wiper and a winding, said winding of said second potentiometer being connected across the output of one of said output channels corresponding to said one input channel, the wipers of both of said potentiometers being movable with the output shaft of said servomechanism; and a timer to operate said second, third and first switch means in succession, said second switch means being actuable to connect said second resistor to the input of said first amplifier, said third switch means being actuable to connect said third and fourth resistors to the input of said second amplifier, said first switch means being actuable to connect said first resistor to the output of said first amplifier, said first potentiometer being connected to maintain the output of said one output channel proportional to the output of said second amplifier, said second potentiometer being connected to maintain the input to said first amplifier inversely proportional to the output of said second amplifier.

8. The invention as defined in claim 7, wherein said first and second potentiometers have logarithmic windings, said servomechanism including third and forth potentiometers each having a wiper and a winding, the winding of said third potentiometer being linear, the winding of said fourth potentiometer being logarithmic, said servomechanism also having a servo reference voltage supply, a difference circuit, a servo amplifier and a servo motor, said difference circuit being connected from said second amplifier and the wiper of said fourth potentiometer to the winding of said third potentiometer, the wiper of said third potentiometer being connected to the input of said servo amplifier, the output of said servo amplifier being connected to said servo motor, said servo reference voltage supply being connected across the winding of said fourth potentiometer, said servo motor including the output shaft of said servo mechanism, said output shaft being adapted to move the wipers on all of said potentiometers simultaneously.

9. Control apparatus comprising: a utilization device; first means to generate an excitation signal; second means actuable to level shift said excitation signal; third means for producing an output signal proportional to an operating characteristic of said utilization device controllable by said excitation signal; fourth means actuable to level shift said output signal; fifth means for sampling the output of said fourth means; sixth means for storing said sampled output for a first predetermined period; seventh means to actuate said second means to level shift said excitation signal inversely with said sampled output during a second predetermined period; and eighth means actuable with said seventh means for actuating said fourth means to level shift said output signal in accordance with said sampled output, said periods being mutually exclusive.

References Cited
UNITED STATES PATENTS

| | | | |
|---|---|---|---|
| 3,195,554 | 7/1965 | Hanna | 137—88 |
| 3,273,035 | 9/1966 | Inderhees | 318—20.55 X |

RICHARD C. QUEISSER, Primary Examiner

J. R. FLANAGAN, Assistant Examiner